United States Patent
Kuberka et al.

(10) Patent No.: US 7,814,061 B2
(45) Date of Patent: Oct. 12, 2010

(54) METHOD FOR PRESERVING PRIVACY WITH IMAGE CAPTURE

(75) Inventors: Cheryl J. Kuberka, Penfield, NY (US);
John N. Border, Walworth, NY (US);
Andrew C. Blose, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 359 days.

(21) Appl. No.: 12/018,829

(22) Filed: Jan. 24, 2008

(65) Prior Publication Data

US 2009/0193055 A1      Jul. 30, 2009

(51) Int. Cl.
G06F 7/00         (2006.01)
G06K 9/00         (2006.01)

(52) U.S. Cl. .................. 707/661; 707/662; 382/115; 382/118

(58) Field of Classification Search ............... 707/661, 707/662, 999.107; 382/115, 118
See application file for complete search history.

(56) References Cited

U.S. PATENT DOCUMENTS

| | | |
|---|---|---|
| 7,028,058 B2 | 4/2006 | Russon |
| 7,668,345 B2 * | 2/2010 | Kiyohara et al. ............ 382/115 |
| 2004/0123131 A1 | 6/2004 | Zacks et al. |
| 2005/0271251 A1 | 12/2005 | Russell et al. |
| 2006/0222213 A1 * | 10/2006 | Kiyohara et al. ............ 382/115 |

FOREIGN PATENT DOCUMENTS

WO       2004/072897       8/2004

* cited by examiner

*Primary Examiner*—Vincent Boccio
(74) *Attorney, Agent, or Firm*—Frank Pincelli; Raymond L. Owens (57) ABSTRACT

The present invention discloses a method and system that automatically analyzes digital images containing people or objects to generate derived data from the images including non-imaging numerical data and text data. The image content of the digital image can then be destroyed and the derived data can be stored along with any associated capture metadata for use and/or analysis. By converting images containing people to derived data and associated capture metadata, which does not include images of people or likenesses of people, the privacy of the individual is maintained. The method is useful for security monitoring and advertising.

6 Claims, 6 Drawing Sheets

METHOD FOR PRESERVING PRIVACY WITH IMAGE CAPTURE

FIELD OF THE INVENTION

The invention pertains to a method for the capture of images in public areas that preserves the privacy of those being imaged.

BACKGROUND OF THE INVENTION

The capture and analysis of images of people and objects in public spaces for security applications is well known in the art. Images can be captured as still images at regular intervals of time or continuously, as in the case of videos. The images are then stored for later reference to determine the identification of the people and objects in the space, or the images are stored and examined to identify when a person enters a secure area or to determine when and where objects are moved within the field of view of the image capture device. However, this approach may intrude upon the privacy of the people in the images and the owners of the objects because the images are typically captured without the consent of the people or owners. There is a desire to maintain the privacy of people and objects while enabling images to be captured and image information to be retained in a database for security, sponsored advertising and other uses.

United States Patent Application US20050271251 by Russell teaches a method of managing video data storage in a multi camera video surveillance system in an intelligent and automatic way. A series of rules are applied to the video data to determine the relative importance of different portions of the video data. The video data with the most importance is stored at higher resolution while less important data is deleted, compressed or archived. Image data is preserved in its entirety or partially.

European Patent Organization Patent Application WO2004/072897 by Goldberg discloses a method for collecting images of a patron in an entertainment venue that includes facial recognition of the patron's face within the images to simplify the storage and distribution of the images for a patron. In order to enhance the reliability of the facial recognition system, information about the patron including clothes, height, other associated people, use of glasses and jewelry, disposition of facial hair is also gathered. In the method described by Goldberg, a minimum of two images must be captured. The first image in WO2004/072897 serves as a reference to establish the person's identity and characteristic features. The second image is the desired image containing the person of interest. The information from the reference image is used to find a match in the second image set to identify the person, so information from both images has to be merged. One of the main objectives is to be able to retrieve images corresponding to a given person.

US 2004/0123131 discloses a method for processing image metadata for an image to be transmitted to a receiver. In accordance with the method, metadata access privileges are determined for the receiver and receiver metadata is produced from the image metadata based upon the metadata access privileges for the receiver. The receiver metadata is associated with the image. The metadata processing system and the method developed automatically controls the metadata that is associated with an image so that such metadata is not unintentionally transmitted to others. The image files are made available to receivers with all or limited metadata.

When electronic image files are manipulated with an image editor, i.e., software for editing or viewing electronic images, the image editor frequently strips away and discards any metadata that is recorded in the image file. The user is typically unaware that the metadata has been lost. U.S. Pat. No. 7,028,058 teaches a method of preserving metadata in an electronic image file that includes copying metadata into the image file from a metadata backup database after the metadata are removed from the electronic image file.

There are many images that are obtained with the consent of people such as employee pictures and driver's licenses that are stored in databases along with other information about the people that can be accessed under certain conditions. Similarly, there are images of people that are in the public domain that can be accessed without privacy concerns. However, using these images is very different from capturing images of people without their consent particularly when the images are subsequently utilized without their consent.

In all of the references mentioned above, all or part of the original image files are preserved with or without metadata. There remains a problem of maintaining privacy associated with retained images. None of the mentioned references remove all of the image pixels from the original data files (including the thumbnail images). Whenever any portion of an image file is retained, there is a possibility of people, objects, locations, businesses, brand names or situations to be identified leading to privacy issues. What is needed is a way of obtaining visual information while maintaining the privacy of people, objects, locations or situations in the imaged scene.

SUMMARY

The invention endeavors to solve the problem of capturing images in a way that maintains the privacy of people, objects, locations or situations. In one embodiment of the invention a method is described for creating a derived data based on captured images that are deleted, comprising the steps of;
 a) obtaining digital images and associated capture metadata;
 b) analyzing the digital images and associated capture metadata so as to obtain or create derived data;
 c) deleting said digital images;
 d) storing the derived data and associated capture metadata;
 e) utilizing said derived data and associated capture metadata.

In another embodiment of the invention a method is disclosed for obtaining image content based on captured images that are deleted, comprising the steps of;
 a) providing a first database of stored image identifiers, each stored image identifier having associated information;
 b) obtaining digital images and associated capture metadata;
 c) analyzing the digital images and associated capture metadata so as to obtain or create derived data;
 d) deleting said digital images sometime after analyzing;
 e) storing the derived data and associated capture metadata;
 f) comparing said derived data or associated capture metadata with said stored image identifiers, when one or more of said derived data or associated capture metadata matches one or more of said stored image identifiers, obtaining associated information from said first database;
 g) utilizing said derived data, associated capture metadata or said obtained associated information from said first database.

In yet another embodiment of the invention a method is described for retaining image content based on captured images that are deleted, comprising the steps of;

a) obtaining digital images and associated capture metadata;
b) analyzing the digital images and associated capture metadata so as to obtain or create derived data;
c) deleting said digital images sometime after analyzing;
d) retaining said derived data, said associated capture metadata.

BRIEF DESCRIPTION OF THE DRAWINGS

The present invention will be more readily understood from the detailed description of exemplary embodiments presented below considered in conjunction with the attached drawings, of which.

DETAILED DESCRIPTION

The present invention discloses a method and system that automatically analyzes digital images containing people or objects to generate derived data from the images including non-imaging numerical data and text data. The image content of the digital image can then be destroyed and the derived data can be stored along with any associated capture metadata for use and/or analysis. By converting the images containing people to derived data and associated capture metadata, which does not include images of people or likenesses of people, the privacy of the individual is maintained. Privacy issues can also be encountered with images of objects, locations or situations wherein the method of the invention can also be applied. It should be noted that the present invention can be applied to all digital images, which include still images or moving images such as video.

Metadata is the non-imaging data that is associated with an image. Capture metadata is any data that is recorded at the time of image capture. Capture metadata can include: the capture conditions, the time, the location of the capture device, the temperature of the capture device, the temperature of the environment surrounding the capture device, the orientation of the capture device, audio, multi-sensory data, physiological data such as biofeedback or text labels.

Derived data includes non-imaging data and text data. Derived data is obtained or created by analyzing the image (or series of images), the associated capture metadata or a combination of image and associated capture metadata to identify attributes in the image. For example, a face detection algorithm can be run on the image data generating the locations of the faces in the image and the derived data in this case can be the locations and the number of faces in the image. Another example of derived data is the use of the image capture location coordinates, which are stored as latitude and longitude wherein, a reverse geocoding algorithm translates the latitude and longitude into the derived data of a street address. Derived data may be stored along with associated capture metadata in the form of text, numbers or other forms of data storage. Further examples of derived data includes, but is not limited to: number of people or faces in the image; the physical characteristics of the people in the image (e.g. hair color, hair style, eye color, eye shape, lip shape, ear shape, nose shape, skin color, facial hair, eye brow shape, face shape, height, body type, gender, blemishes, tattoos, teeth shape, age qualities, wrinkles); facial expressions and apparent mood of people (e.g. smiling, grimacing, frowning, crying, laughing, sleeping); personal accessories on the people (e.g. glasses, hat, scarf, braces on teeth, jewelry); type of objects and characteristics of objects present in the scene (e.g. pets, pet type, location of objects, the reflectivity of objects, the absorption of objects, with a hyperspectral capture device the hyperspectral characteristics of objects (e.g. temperature, material identification, foliage type (see www.tydac.com/pdfs/hyperspectral_g9.pdf, Gomez, Richard, "Hyperspectral Imaging: A Useful Technology for Transportation Analysis", Optical Engineering, 41 (9), 2143, 2002)), the presence of chairs or other furniture, the presence of floor coverings, the presence of wall adornments, the color of objects in the scene, the spectral characteristics of objects in the scene, sports equipment, vehicles); scene lighting (e.g. light sources; light brightness; the presence of windows, the spectral distribution of the lighting in the scene); the general setting of the scene in the image (e.g. mountains, buildings, interior room, gymnasium, pool, beach, snow scene, concert hall, lake, ocean, cloudy, snowy, rainy, sunny, identifiable event type such as birthday, wedding, funeral, concert); motion characteristics (e.g. the level of activity in the scene, the location of motion and the identification of the object or person that is moving); and optically recognized text (e.g. license plate numbers, identifiable markings on objects or clothing, book titles, magazine titles, product labels, signs).

Derived data can for example be utilized for security monitoring of general people related conditions such as whether a person has entered the area being imaged or whether a person with characteristics that are different from the people that are expected to be in the area being imaged is present. Derived data can also be utilized to determine the general characteristics of the people or the number of people viewing an advertisement or the general characteristics of the audience in a theater. As a further example, the derived data can be utilized to find or access data in other databases that can be linked to the derived data wherein consent for use has been given for the other data.

One advantage of the invention is that privacy associated with capturing images of people without their knowledge or consent is maintained since the images of people are not retained. As such, the invention is well suited to use in security systems in limited access areas, security systems that monitor people and objects in an environment, human behavior study and advertising systems that are used in private and public locations. More generally, the approach of gathering information while maintaining privacy, which is described as the present invention, can be utilized for the following: modifying advertising, visual content on a display or modifying auditory content in response to a viewer's characteristics to better match their interests or buying tendencies; gauging the reaction of people to visual and auditory content being presented; documenting characteristics of the scene; identifying the characteristics of people present in the scene; and identifying objects in the scene.

A further advantage is that the amount of data that must be stored or communicated (transmitted) is greatly reduced since only the derived data and associated capture metadata is stored. Typically digital image data files are quite large requiring mass storage space, compared to the relatively small storage space required by a derived data and associated capture metadata file. The difference in file size provided by the invention is especially important when the image data is stored in an uncompressed state and as image resolution increases the overall percentage of storage space consumed by image data increases dramatically. In most cases, the deletion of image data while retaining the derived data and associated capture metadata will result in substantial savings of storage space or data transmission time or communication bandwidth required. As an example: A 10 megapixel image stored as a JPEG file with EXIF metadata usually requires 3-4 megabytes of storage. If you delete the digital image data, the storage size shrinks to 16 kilobytes.

Figure 1:
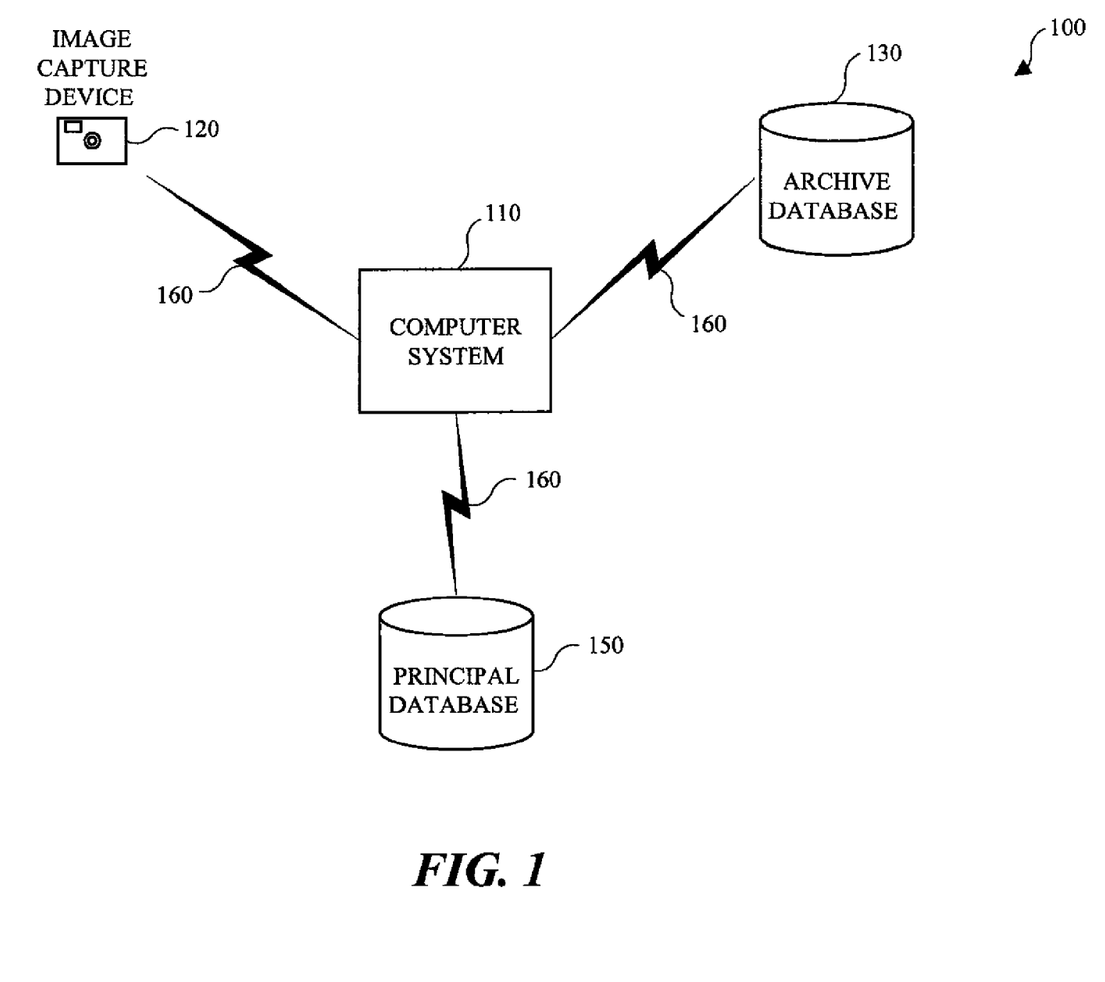
FIG. 1 illustrates a system, according to an embodiment of the present invention, for practicing the various methods of preserving privacy with digital image capture, according to embodiments of the present invention.

FIG. 1 illustrates a system for preserving the privacy of the digital images, according to an embodiment of the present invention. The system 100 includes a computer system 110, a digital image capture device 120, an optional archive database 130, and a principal database 150. The computer system 110, the archive database 130, and the principal database 150 are connected to the computer system 110 through a communication network 160. The computer system 110 may comprise one or more computers communicatively connected to implement the various processes of the embodiments of the present invention, including the method disclosed in FIGS. 3 and 4 as described later herein.

The archive database 130 and principal database 150 include one or more computer-accessible memories configured to store the information needed to execute the processes of the various embodiments of the present invention, including the example processes as later described herein. The archive database 130 and principal database 150 may be distributed data-storage systems including multiple computer-accessible memories connected by communication network 160 to the computer system 110 via a plurality of computers and/or devices. On the other hand, the archive database 130 and principal database 150 need not be a distributed data-storage system and, consequently, may include one or more computer-accessible memories located within a single computer or device.

The communication network 160 may include any type of connection, whether wired, wireless, or both, between devices, and/or computers, and/or programs in which data may be communicated. Further, the communication network 160 may include a connection between devices and/or programs within a single computer, a connection between devices and/or programs located in different computers, and a connection between devices not located in computers at all. While the particular embodiment illustrated in FIG. 1 is shown with the computer system 110, the image capture device 120, the principal database 150 or the archive database 130 are shown as system components, it should be understood that they can be combined in a single device.

The archive database 130 contains stored image identifiers linked to associated information. For the purpose of the present invention, image identifiers comprise information that can be used to identify individual images in a database. Examples of image identifiers include: image sequence number; date, time, or temperature at the time of image capture; scene location; event description (e.g. birthday, wedding, funeral, concert); number of people or faces in the image; the physical characteristics of the people in the image (e.g. hair color, hair style, eye color, eye shape, lip shape, ear shape, nose shape, skin color, facial hair, eye brow shape, face shape, height, body type, gender, blemishes, tattoos, teeth shape, age qualities, wrinkles); personal accessories on the people (e.g. glasses, hat, scarf, braces on teeth, jewelry); type of objects and characteristics of objects present in the scene (e.g. pets, pet type, location of objects, the presence of chairs or other furniture, the presence of floor coverings, the presence of wall adornments, the color of objects in the scene, the spectral characteristics of objects, sports equipment, vehicles); the lighting of the scene (e.g. light sources, light brightness, the presence of windows, the spectral distribution of the lighting in the scene); the general setting of the scene in the image (mountains, buildings, interior room, gymnasium, pool, beach, snow scene, concert hall, lake, ocean, cloudy, snowy, rainy, sunny); and optically recognizable text (e.g. license plate numbers, identifiable markings on objects or clothing, book titles, magazine titles, product labels, signs).

The principal database 150 may contain derived data, associated capture metadata, and/or associated information. The contents of archive database 130 and principal database 150 are used to execute the methods of the various embodiments of the present invention.

Figure 2A:
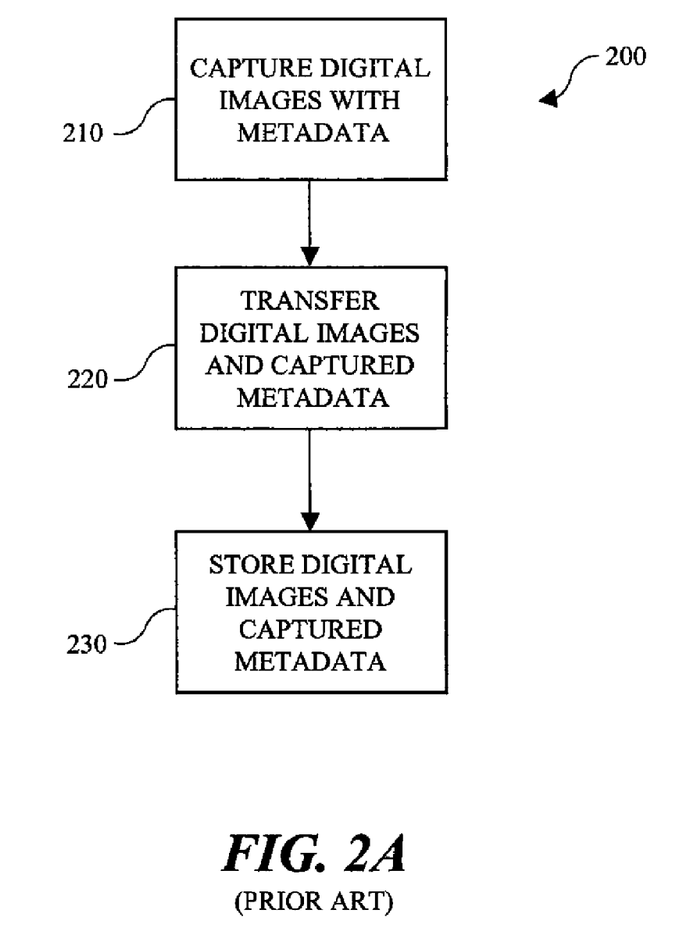
FIG. 2A illustrates, a flowchart illustrating a typical embodiment of the prior art of the present invention.
Figure 2B:
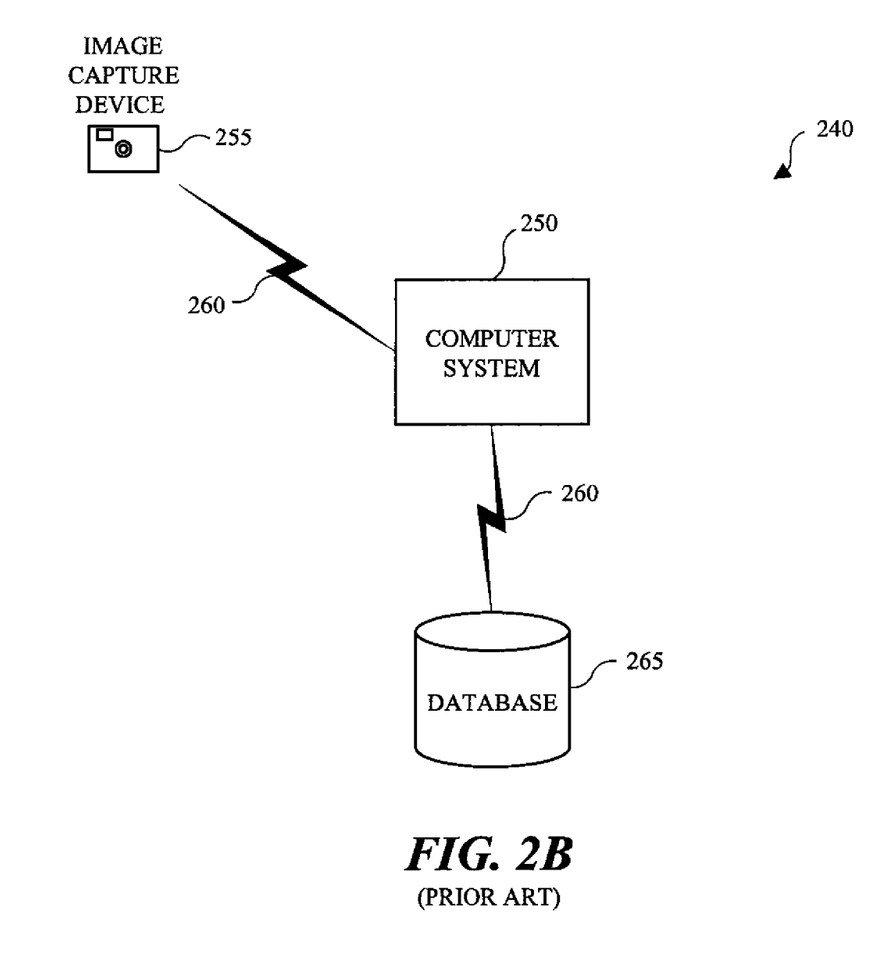
FIG. 2B illustrates a system for capturing and storing images in a prior art system.

FIGS. 2A and 2B illustrate a flow diagram 200 and a system diagram 240 respectively for an image storing system from the prior art. Prior art system 240 comprises an image capture device 255 which is connected by a communication network 260 to a computer system 250. Computer system 250 is connected by a communication network to database 265. At step 210, digital images and metadata are captured with an image capture device 255 and stored in memory on the image capture device 255. At a point in time after image capture, the digital images and metadata are transferred over a communication network 260 to a computer system 250 at step 220. Once transferred to the computer system 250, the digital images including the image and associated capture metadata are stored in database 265 at step 230. At some later time, the images are utilized for a purpose such as security monitoring. It will be noted by those skilled in the art that occasionally digital images are captured without metadata or alternately the metadata is separated from the digital image during image processing or storage. In contrast to the present invention described herein, in the prior art system the captured images are stored.

Figure 3:
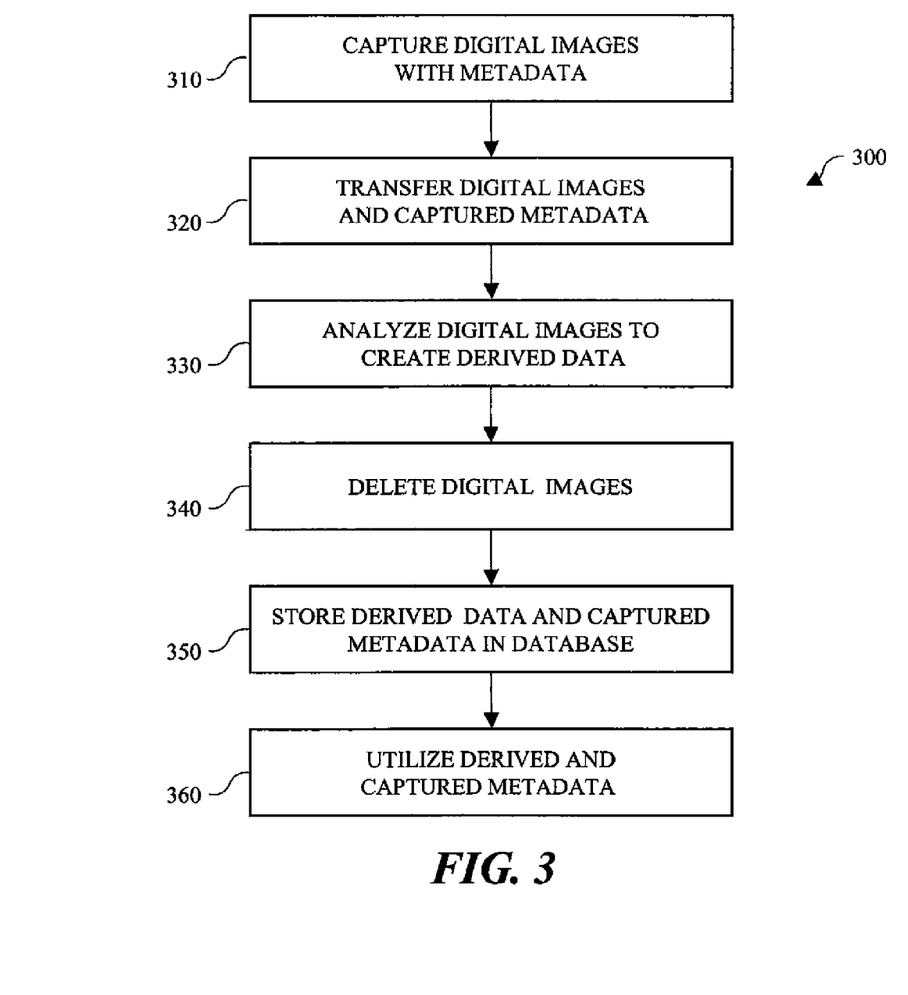
FIG. 3 illustrates, a flowchart of a method according to an embodiment of the present invention.

FIG. 3 illustrates, a flow diagram 300 for a method of storing image information without storing the captured images using the computer system 110 (see FIG. 1), according to an embodiment of the present invention. At step 310, digital images and metadata are captured using image capture device 120 and stored temporarily on the image capture device 120. The digital images and associated capture metadata obtained in step 310, are then transferred by a communication network 160 to the computer system 110 at step 320, and stored on the computer system 110. At step 330, the computer system 110 analyzes the digital images and associated capture metadata to create derived data. Wherein, a wide variety of derived data can be obtained or created by the analysis performed in step 330. The derived data can be indexed by information that describes the capture conditions, for example, the time of day or events that are occurring in the scene. Then at step 340, the digital image data is deleted from both the temporary storage on the image capture device 120 and the computer system 110. Those skilled in the art will appreciate that either the pixel data itself or the entire digital image file can be deleted. The derived data and associated capture metadata is stored in step 350 either on the principal database 150 or on another storage device, which could be part of computer system 110. Alternately, the derived data and associated capture metadata could be stored on a storage device that is associated with image capture device 120. In an alternate embodiment, the digital image is deleted from the image capture device in step 320 after the digital image has been temporarily stored on the computer system 110. The exact timing of the deleting of the digital images is not important to the invention, only that the digital images are deleted some time after the digital images have been analyzed. In Step 360, the derived data and associated capture metadata is utilized.

The stored derived data and associated capture metadata can be utilized in a variety of ways. In a first utilization, images of a physical location can be captured and analyzed to create derived data on the people or objects present such as at a store or warehouse to improve security. The derived data and associated capture metadata gathered can be stored locally and operated on directly, or sent to another remote computer for storage or further analysis, or an alarm can be sent for appropriate action. In another utilization, images of the people in the vicinity of a video billboard, theater or television can be captured and analyzed to create derived data which includes the makeup of the people to help select imaging content, auditory content or advertising to be displayed or to gage the reaction of the people to image content, auditory content or advertising. Wherein charges can be assessed for gathering the information on the people and their reactions or the information on the people and their reactions can be sold directly to companies to help them improve their advertising strategies.

Figure 4:
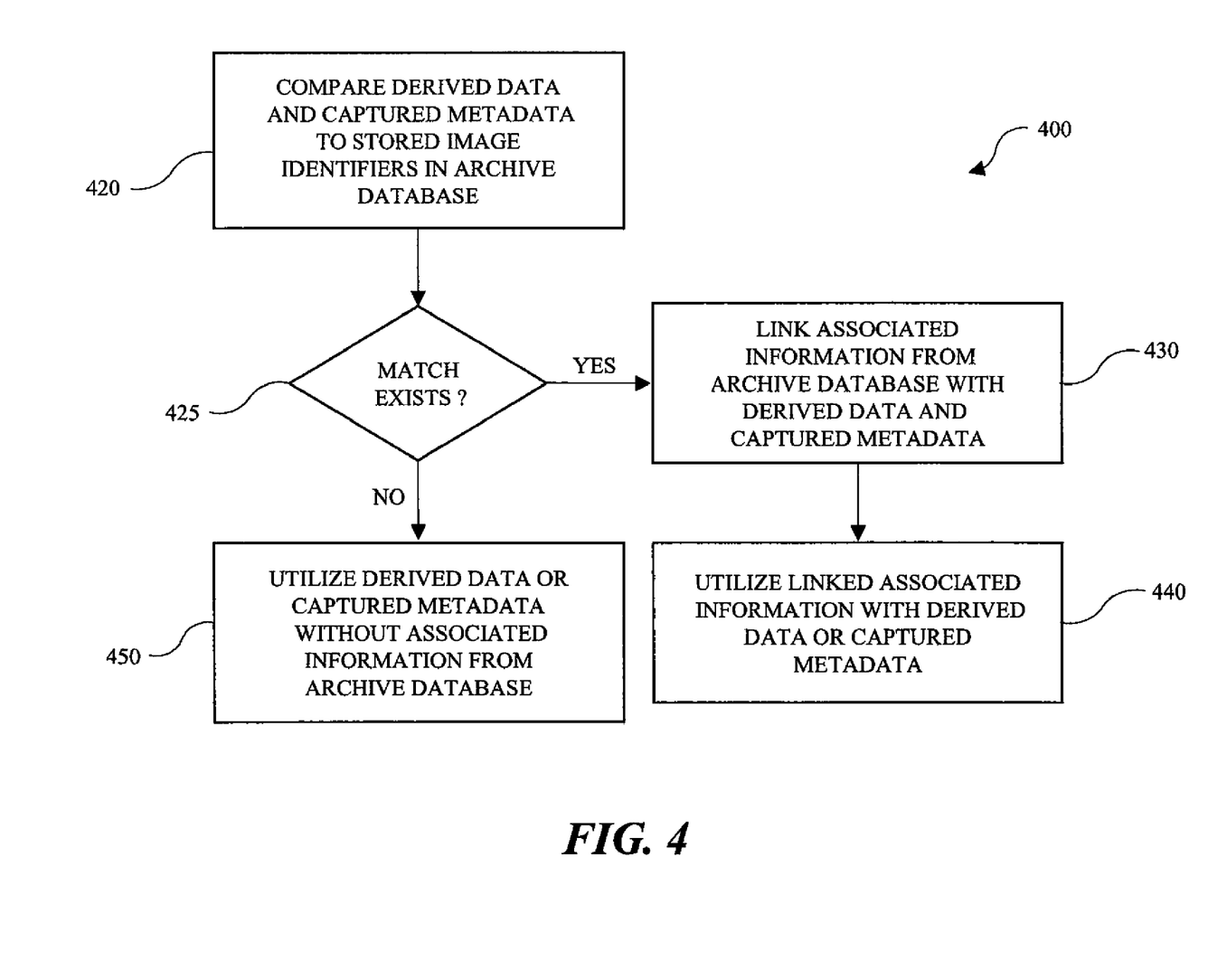
FIG. 4 illustrates, a flowchart for a second method according to an embodiment of the present invention.

In a further embodiment of the invention, a method is disclosed wherein the derived data and associated capture metadata are utilized to search other databases to obtain more information that is related to the associated capture metadata or derived data. FIG. 4 illustrates, a flow diagram 400 for a method of utilizing derived data or associated capture metadata from captured images to obtain associated information in archive database 130. Wherein archive database 130 can be any database, containing information that is indexed by stored image identifiers that can be accessed over the communication network 160. Following the creation of derived data and the storage of derived data along with associated capture metadata in the principal database 150, in the same manner as previously described in FIG. 3, in step 420, derived data or associated capture metadata, is compared to stored image identifiers in the archive database 130. In step 425, if there is a match between the derived data or associated capture metadata and the stored image identifiers, the associated information with respect to the image identifiers from the archive database 130 is obtained or linked to the derived data and associated capture metadata in step 430. The derived data or the associated capture metadata with the obtained associated information from the archive database 130 is utilized in step 440. Alternately, if there is not a match in step 425, the derived data or associated capture metadata is utilized without linked associated information in step 450. For example, the archive database 130 may contain stored image identifiers that include: date/time of capture, facial features, GPS coordinates, text tags, SIFT algorithm features, or object characteristics that are used to index or arrange associated information which includes a series of images of people and places along with names and descriptions of the people and places.

Examples of utilization of derived data or metadata with obtained associated information may include various applications. In a first example of utilization of the present invention, images of people or objects at warehouse location are captured and analyzed to create derived data on the people and objects, which is then used to match to names and descriptions of the people and objects from an employee database and a product database. A record of people working in the warehouse with which products is created for the warehouse location and stored to assist with product tracking and any product liability claims that may occur. In another example of utilization of the present invention, images of vehicles and drivers are obtained from a city street as they pass a storefront. The images are analyzed to create derived data of the type of people and cars that pass by the storefront over the course of a business day. The derived data includes information regarding general people types, gender, age and car characteristics. The derived data is compared to a database of car models to obtain information on the car models from the car characteristics. From the derived data, a report on potential customers passing the storefront is generated which includes customer demographics and car model preferences which can be used to target advertising for radio and television advertisements for the store to entice more customers to visit the store. In a further example of utilization of the present invention, images are captured over a period of time of the people in Times Square where many electronic billboards are located. The images are analyzed to create derived data on the people, the clothes the people are wearing and the movement of the people relative to the advertisements being shown on the electronic billboards. The derived data on the clothes the people are wearing is compared to a database on clothes being sold by the surrounding stores to determine which stores the people shop in. A report can then be generated which shows how people that shop in a specific store react to specific advertisements to help sell advertising packages to the stores located in the vicinity of Times Square.

In another example embodiment of the present invention, the method described is used for obtaining the general characteristics of individual people such as would be found in front of a television, theater or advertising device such as a display screen or a billboard. In this case, a digital capture device 120 is placed in the general area of the television, theater or advertising device. Given that televisions, theaters or advertising devices are generally located in places where privacy issues may arise such as homes or public places, the present invention provides a solution that would enable information on the general characteristics of the people viewing the television, theater or advertising device while simultaneously preserving the privacy of the people. Information on associated objects and the environment can also be obtained to provide additional context for the needs and interests of the people. The derived data can then be used to modify advertising or make selections of visual and auditory presentations that are targeted to the people at the scene. Likewise, derived data can be gathered on the responses of the people to the visual and auditory information being presented while maintaining the privacy of the individual people and any associated objects/environment. The derived data and associated capture metadata may then be communicated back to the operator of the television, theater or advertising device or the provider of the images being displayed on the television, theater or advertising device and charges can be assessed for the service.

Figure 5:
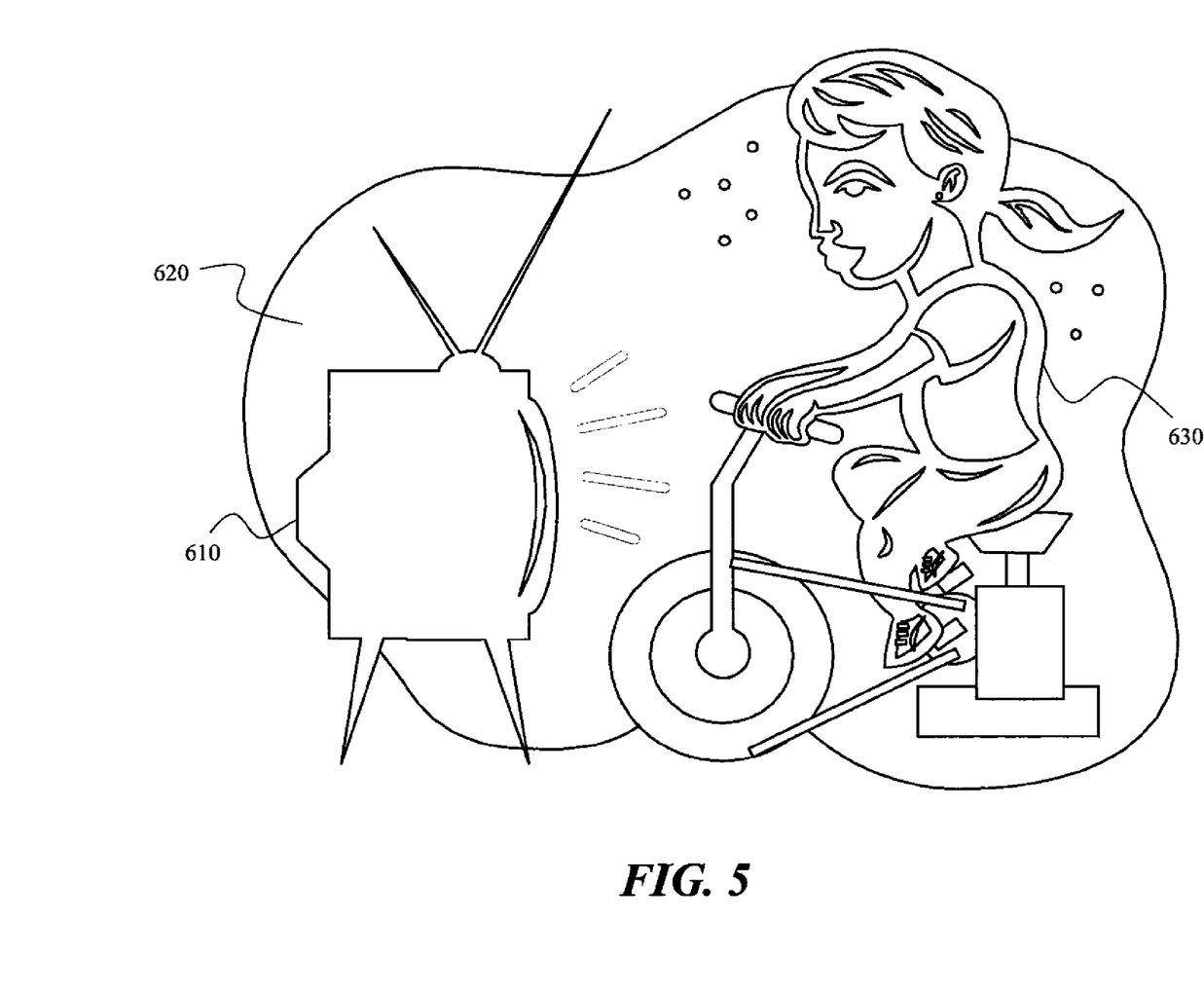
FIG. 5 illustrates a system diagram of the invention when used to obtain information about the people viewing a television or the environment surrounding a television wherein an image capture device is placed near to, associated with or integrated into a television.

FIG. 5 shows an example of an embodiment in which a person 630 is watching a television 610 and an image capture device 620 is attached to the television 610. In this case, the invention describes a system following the process shown in FIG. 3 in which images of the individual (person 630) and adjacent objects are captured along with metadata by the image capture device 620. The images are analyzed to create derived data, for example, how many people are watching, the general age of the people, the gender of the people, the color of the people, the general activity level of the people, the other objects present in the surrounding area such as chairs, couches, lamps, etc. The images are then deleted to preserve the privacy of the people/objects/environment at the imaging location. The derived data and associated capture metadata are then communicated to the provider of the information being displayed on the television 610. As shown in FIG. 5, the derived data would include: 1 person is present, the person has long hair with dark skin, the person doesn't have glasses, the person doesn't have wrinkles so the person could be young, the person is of adult size, the person has an earring, there is a steady activity level (motion) present which could be exercising, there is no furniture present, a bicycle is present which could be an exercise bike. Based on this information and inferences that can be drawn by associations between the individual bits of information, whereby advertising could then be tailored by the provider of the information being displayed on the television which would likely be more of interest to the person 630, for example: exercise products; adult woman's health products; home decorating products; exercise equipment; etc. Within the scope of the invention, all this useful information on the characteristics of the captured individuals could be gathered unobtrusively while maintaining the privacy of the people.

In yet another example embodiment of the present invention, images of people in an office setting are captured for security monitoring. The captured images are analyzed following the method illustrated in FIG. 3 to create derived data. Wherein the derived data includes a description of the people in the image that can be obtained by analyzing the captured image including: hair color, eye color, facial hair, gender, blemishes, eye shape, lip shape, nose shape and ear shape. The associated capture metadata would include the location, the time of day and the direction of image capture. The derived data and associated capture metadata are then compared to the image identifiers in another database as described in FIG. 4 wherein the another database is a database of employee pictures that were obtained with the employees permission when they were hired. The image identifiers in the database of employee pictures would include a description of the people that can be obtained from analyzing their employee pictures along with pertinent job information for example: hair color, eye color, gender, facial hair, eye shape, lip shape, nose shape, ear shape, location that they work at and job description. If a portion of the derived data or associated capture metadata matches a portion of the image identifiers in the database of employee pictures, the derived data and associated capture metadata is linked to the associated information. The data set would then contain, the location, time of day and direction that the image was captured, a general description of the people in the captured image, images of the people that likely match the descriptions of the people in the captured image and which general characteristics that match between the derived data and the employee pictures, the location that the likely matching people work at and a job description of the likely matching people.

It is to be understood that the exemplary embodiment(s) is/are merely illustrative of the present invention and that many variations of the above-described embodiment(s) can be devised by one skilled in the art without departing from the scope of the invention. It is therefore intended that all such variations be included within the scope of the following claims and their equivalents.

PARTS LIST

100 Imaging system
110 Computer system
120 Image capture device
130 Archive database
150 Database
160 Communication network
200 Prior art flow chart for capture of digital images and metadata
210 Step
220 Step
230 Step
240 Prior art system for capturing and storing images
250 Computer system
255 Image capture device
260 Communication network
265 Database
300 Process flow diagram
310 Step
320 Step
330 Step
340 Step
350 Step
360 Step
400 Process flow diagram
420 Step
425 Step
430 Step
440 Step
450 Step
610 Television or display
620 Image capture device
630 Individual or person

What is claimed is:

1. A method for modifying advertising; modifying visual content on a display; modifying auditory content; or gauging the reaction of people to visual and auditory content that preserves privacy, comprising the steps of;
    a) obtaining digital images and associated capture metadata;
    b) analyzing the digital images and associated capture metadata so as to obtain derived data;
    c) deleting said digital images so that the digital images are not retained;
    d) storing the derived data and associated capture metadata; and
    e) utilizing said derived data for modifying advertising; modifying visual content on a display; modifying auditory content; or gauging the reaction of people to visual and auditory content to customize the advertising for one or more users.

2. The method of claim 1, wherein the derived data comprises: number of people or faces in the image; the physical characteristics of the people in the image; facial expressions and apparent mood of the people; personal accessories on the people; types of objects present and characteristics of the objects present in the scene; scene lighting; general setting of the scene; motion characteristics in the scene; or optically recognized text.

3. A method for obtaining image content based on captured images that are deleted to preserve privacy, comprising the steps of;

a) providing a first database of stored image identifiers, each stored image identifier having associated information;
b) obtaining digital images and associated capture metadata;
c) analyzing the digital images and associated capture metadata so as to obtain derived data;
d) deleting said digital images after said analyzing step so that the digital images are not retained;
e) storing the derived data and associated capture metadata;
f) comparing said derived data and associated capture metadata with said stored image identifiers and when one or more of said derived data or associated capture metadata matches one or more of said stored image identifiers, obtaining said associated information from said first database; and
g) utilizing said obtained associated information from said first database.

4. A method of claim 3, wherein said associated information includes images or data that have been obtained with permission.

5. A method of claim 3, wherein the utilizing step comprises one or more of the following: modifying advertising; modifying visual content on a display; modifying auditory content; reducing required data communication bandwidth; reducing data transmission times; documenting characteristics of the scene; security monitoring; identifying the characteristics of people present in the scene; gauging the reaction of people to visual and auditory content; identifying objects in the scene; searching other databases to obtain more information; or obtaining related images.

6. The method of claim 3, wherein the derived data comprises: number of people or faces in the image; the physical characteristics of the people in the image; facial expressions and apparent mood of the people; personal accessories on the people; types of objects present and characteristics of the objects in the scene; scene lighting; general setting of the scene; motion characteristics in the scene and optically recognized text.

* * * * *